US008739121B1

(12) United States Patent  
Jones et al.

(10) Patent No.: US 8,739,121 B1
(45) Date of Patent: May 27, 2014

(54) PROVIDING ACCESS TO EXTERNAL CONTENT USING METADATA IN SOURCE CODE LISTINGS

(75) Inventors: Mark Jones, Waltham, MA (US); Rob Purser, Wayland, MA (US); Steve Johnson, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 1194 days.

(21) Appl. No.: 12/134,805

(22) Filed: Jun. 6, 2008

Related U.S. Application Data

(60) Provisional application No. 61/011,346, filed on Jan. 16, 2008.

(51) Int. Cl.
*G06F 9/44* (2006.01)
*G06F 17/24* (2006.01)

(52) U.S. Cl.
CPC ............... *G06F 8/33* (2013.01); *G06F 17/241* (2013.01)
USPC ........................................... 717/113; 717/110

(58) Field of Classification Search
CPC .................................. G06F 8/33; G06F 17/241
USPC .................................................. 717/110–113
See application file for complete search history.

(56) References Cited

U.S. PATENT DOCUMENTS 6,009,441 A * 12/1999 Mathieu et al. ............... 715/236
7,693,860 B2 * 4/2010 Babanov et al. .............. 715/212
7,950,064 B2 * 5/2011 Chavez et al. .................. 726/28
2002/0184611 A1 * 12/2002 Endejan ........................ 717/113
2003/0132965 A1 * 7/2003 Santori et al. ................. 345/763
2003/0163323 A1 * 8/2003 Bluvband ...................... 704/275
2003/0167447 A1 * 9/2003 Hatta et al. .................... 715/517
2004/0117773 A1 * 6/2004 Nicolle ......................... 717/136
2006/0212469 A1 * 9/2006 Babanov et al. .............. 707/102
2007/0288889 A1 * 12/2007 Harrison et al. .............. 717/110
2008/0155397 A1 * 6/2008 Bissonnette et al. .......... 715/256
2008/0232763 A1 * 9/2008 Brady .............................. 386/46
2009/0129596 A1 * 5/2009 Chavez et al. ................ 380/277

OTHER PUBLICATIONS

Ying et al., "Source code that talks: an exploration of Eclipse task comments and their implication to repository mining," May 2005, ACM, p. 1-5.*

* cited by examiner

*Primary Examiner* — Qing Chen
(74) *Attorney, Agent, or Firm* — Nelson Mullins Riley & Scarborough LLP

(57) ABSTRACT

Exemplary embodiments may provide one or more computer readable storage media storing executable instructions that when executed on processing logic output a source code listing and external content to an editor. The media may hold instructions for creating a source code listing in an editor, the source code listing being executable when the source code listing is compiled or interpreted. The media may further hold instructions for inserting a non-executable statement into the source code listing, the non-executable statement including metadata identifying external content. The media may hold instructions for interpreting the metadata. The media may further hold instructions for communicating with external content. The media may also hold instructions for outputting the source code listing and the external content to the editor. The media may further hold instructions for interacting with the external content from the source code listing.

21 Claims, 17 Drawing Sheets

600

% display a text file that can be maintained
% separate from the M- file:

604

This is an example of an
equation with three
unknowns.

PROVIDING ACCESS TO EXTERNAL CONTENT USING METADATA IN SOURCE CODE LISTINGS

RELATED APPLICATION

This application claims priority to, and the benefit of, U.S. Provisional Application No. 61/011,346, filed on Jan. 16, 2008, the content of which is hereby incorporated by reference in its entirety.

BACKGROUND INFORMATION

In computer programming, a source code listing is a sequence of programming language statements that can be displayed or output. Often, a programming editor may enable a user to display a source code listing for source code that the user wishes to edit. The source code listing may include one or more comment statements. Comment statements can be non-executable statements that contain textual information, such as descriptive information about the source code. A comment symbol is often placed at the beginning of a comment statement to distinguish the comment statement from the rest of the source code listing which may contain executable statements. In most cases, when the source code is processed by a compiler or interpreter, comment statements are ignored.

SUMMARY

Exemplary embodiments may provide one or more computer readable storage media storing executable instructions that when executed on processing logic output a source code listing and external content to an editor. The media may hold one or more instructions for creating a source code listing in an editor, the source code listing being executable when the source code listing is compiled or interpreted. The media may further hold one or more instructions for inserting a non-executable statement including metadata that identifies external content. The media may also hold one or more instructions for interpreting the metadata. Interpreting may comprise identifying a location of the external content. The media may further hold one or more instructions for communicating with the external content. The media may also hold one or more instructions for outputting the source code listing and the external content to the editor. The media may further hold one or more instructions for interacting with the external content from the source code listing.

In one embodiment, one or more computer readable storage media storing executable instructions are provided. The executable instructions, when executed on processing logic, communicate with external content from an editor. The media may hold one or more instructions for locating external content. A non-executable portion of a source code listing includes metadata that identifies the external content. The media may also hold one or more instructions for interacting with the external content. The media may further hold one or more instructions for outputting the external content and the source code listing on the editor.

In another embodiment, one or more computer readable storage media storing executable instructions are provided. The executable instructions, when executed on processing logic, communicate with external content from a source code listing. The media may include one or more instructions for providing a source code listing including a non-executable statement including metadata. The metadata enables communicating with external content. The media may also include one or more instructions for providing an auxiliary code listing. The auxiliary code listing scans the source code listing for the metadata. The media may further include one or more instructions for outputting the source code listing and the external content on an editor when the metadata is identified. The media may further include one or more instructions for communicating with the external content from the source code listing. The media may also include one or more instructions for compiling the source code listing by a compiler, the compiler ignoring the non-executable statement. The media may include one or more instructions for executing the source code listing.

In another exemplary embodiment a system may be provided. The system may include a memory, a programming editor, a processor and an output device. The memory may store computer program instructions and data. The programming editor may be used to create a source code listing, the source code listing including a non-executable statement including metadata identifying external content. The metadata may be used to communicate with external content. The processor may execute the stored computer program instructions. The computer program instructions may identify the external content. The processor may also interpret the identified external content. Interpreting may comprise identifying a location of the external content. The processor may further invoke an external viewer to be embedded within the editor based on the interpreting. The processor may also retrieve the external content. The output device may output the source code listing and the external content identified by the metadata to the programming editor.

In another exemplary embodiment one or more computer readable storage media storing executable instructions may be provided. The executable instructions, when executed on processing logic, communicate with external content. The media may hold one or more instructions for identifying a designator, the designator denoting a non-executable string including metadata identifying external content. The media may also hold one or more instructions for interpreting the metadata. Interpreting may comprise identifying a location of the external content. The media may further hold one or more instructions for identifying external content based on the interpreting. The external content may include one or more of an image, video, an animation, audio, a web page, a result, a model, a link, or a really simple syndication (RSS) feed. The media may also hold one or more instructions for communicating with the external content. The media may further hold one or more instructions for inserting the external content into the source code listing. The media may also hold one or more instructions for storing the source code listing and the inserted external content in storage.

BRIEF DESCRIPTION OF THE DRAWINGS

The foregoing and other aspects, features, and advantages of the present application will become more apparent and may be better understood by referring to the following description taken in conjunction with the accompanying drawings, in which:

FIG. 6A illustrates an exemplary embodiment in which a text file is displayed along with the source code;

DETAILED DESCRIPTION

I. Overview

Figure 1:
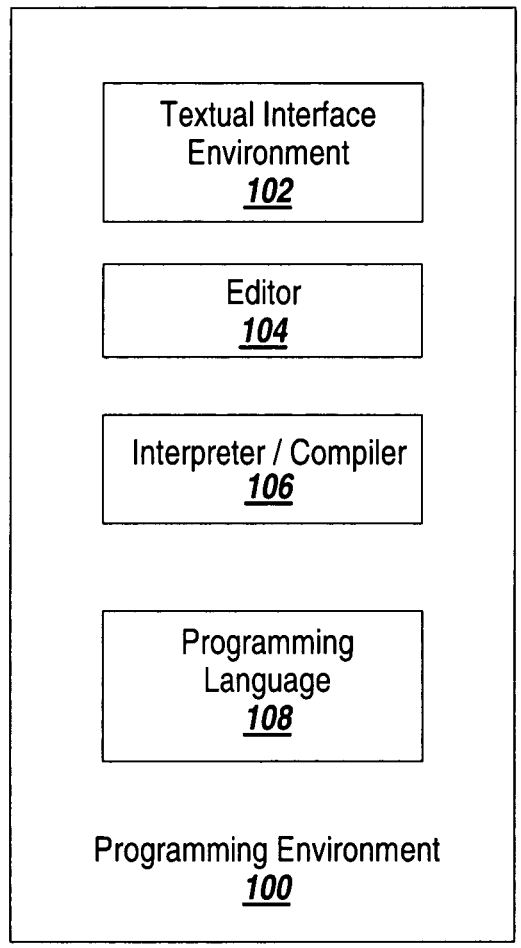
FIG. 1 illustrates a block diagram of an exemplary programming environment that may be used for implementing one or more exemplary embodiments.

Exemplary embodiments may enable a user to access external content in a source code listing. In some exemplary embodiments, the source code listing may include non-executable statements, such as comments that include metadata that identifies or references external content. Metadata may be data that specifies other data. For example, an embodiment may include metadata that comprises attributes that specify to the editor where the external content is and/or how to retrieve the external content. This metadata may include, but is not limited to, a pointer such as a file name or a location address that specifies the external content.

Metadata may also comprise attributes that define how to display or render the external content. For example, external content can include images, video, etc. In an embodiment, external content that includes an image can be referred to using metadata may include one or more of the following: a network path to the file (e.g., \\someServer\someShare\image.jpg), a standard local path to the file (e.g., c:\someDirectories\image.jpg), a URL to the file (e.g., http://www.mathworks.com/someDirectory/image-.jpg), the width to display the image in the editor (e.g., a specified number of pixels, or percentage of the width of the editor window), the height to display the image in the editor (e.g., a specified number of pixels, or percentage of the height of the editor window).

Metadata may further include executable instructions that can be executed to perform one or more operations. For example, for external content such as output from a software application (e.g., a MATLAB® software application) the metadata may include the MATLAB® code to execute and display the results in the middle of the code that is being edited. The external content types are not limited to an image or a MATLAB® output. The external content types may further include video, audio, test output, etc.

The editor may interpret the metadata and access the external content. According to another option, the metadata may interact with the external content. The external content may include, but is not limited to, a really simple syndication (RSS) feed, graphical content, audio clips, web pages, video clips, reports, executable content, text files and other content. Thus, the information available to a user within a source code listing is greatly expanded relative to currently available systems where only textual content is provided in comment statements. With exemplary embodiments, the user is no longer limited having only to textual content in comment statements; rather exemplary embodiments may provide the user with a variety of content beyond text that can be used when viewing source code listings.

Exemplary embodiments may enable external content to be accessed while viewing a source code listing. For example, a reference can be used to access external content while a source code listing is viewed. In an embodiment, references to external content may be contained in comment statements provided in the source code listing. A specific designator at the beginning of the comment statement may indicate to an editor that the comment contains metadata that identifies external content. For example the combination of characters "%#" may serve as the designator. The use of the combination of characters "%#" is for illustrative purposes only, and any symbol, character or a combination thereof may be used as the designator.

The following description of exemplary embodiments provides illustration and description, but is not intended to be exhaustive or limiting to the precise form disclosed. Modifications and variations are possible in light of the below teachings or may be acquired from practice.

II. Exemplary System

FIG. 1 illustrates a block diagram of programming environment 100 that may be used for implementing one or more exemplary embodiments. Programming environment 100 may include textual interface environment 102, editor 104, interpreter/compiler 106 and programming language 108. Programming environment 100 allows a user to develop source code listings in programming language 108.

Textual interface 102 may provide a user interface for the user to interact with the programming environment 100 to build source code listings. Textual interface 102 may also facilitate debugging and/or profiling of a source code listing. Alternatively, implementations of programming environment 100 may include a separate debugger and profiler.

Editor 104 can be used to generate a source code listing, an object code, a compiled executable or a library. Editor 104 may be a text editor. Alternatively, editor 104 may be a graphical text editor, i.e. a combination of a text editor and graphical editor. Editor 104 may be substantially any software component for writing source code, instructions, etc., in a programming language such as Java or C or in a hardware description language such as Verilog or Very-high-speed-integrated-circuits Hardware Description Language (VHDL).

Editor 104 can be used to write source code that can be included in a source code listing. Interpreter/compiler 104 can compile the source code listing into object code and build an executable program, library or substantially any other form of executable instructions. Interpreter is used with an interpreted language while the compiler is used with a compiled language. An interpreted language is a programming language that is compiled into machine readable code at the moment it is run by the interpreter. A compiled language is compiled into machine readable object code only once by the compiler. The source code listing may be designed to run on any processor, microprocessor, dual-core processor, multicore processor, cluster of processors, operating system, computational hardware device, component of a computational hardware device, etc. In one embodiment, the source code listing may include embedded code targeted to run on an embedded system. Additionally, the source code listing can be customized to run on a specific target hardware platform. For example, the source code listing may include fixed-point code to run on a fixed-point processor.

The components of programming environment 100 may be provided on the same computing device, as described below with reference to FIG. 2, or alternatively, the components of programming environment 100 may be coupled to each other via a communication network, as described below with reference to FIG. 3.

Figure 2:
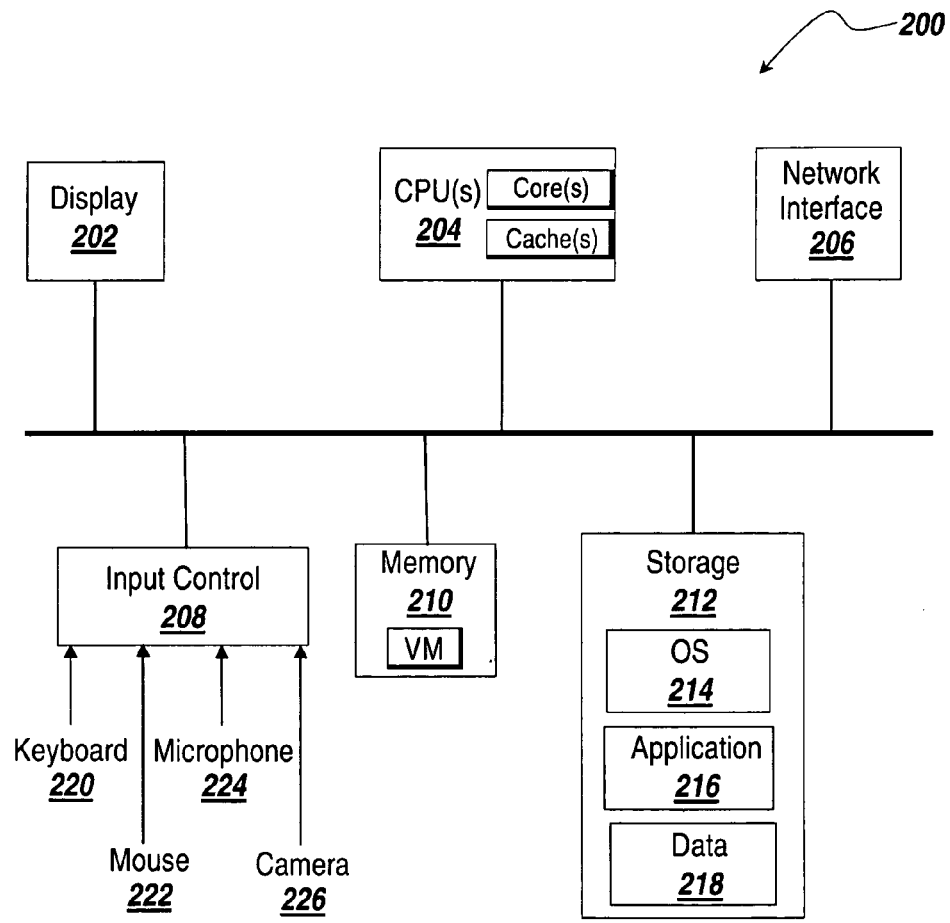
FIG. 2 illustrates an exemplary computing device suitable for practicing one or more exemplary embodiments.

FIG. 2 is an exemplary computing device 200 suitable for practicing one or more exemplary embodiments described below. Computing device 200 is intended to be illustrative and not limiting. Computing device 200 may take many forms, including but not limited to a personal computer, workstation, server, network computer, quantum computer, optical computer, bio computer, Internet appliance, mobile device, a pager, a tablet computer, a smart sensor, and the like.

Computing device 200 may be electronic and may include display 202, Central Processing Unit (CPU) 204, network interface 206, input control 208, memory 210, storage 212, etc. CPU 204 may control components of computing device 200 to provide programming environment 100, textual interface environment 102, editor 104, interpreter/compiler 106 and/or programming language 108. Memory 210 temporarily stores instructions and data and provides them to CPU 204 so that CPU 204 may operate computing device 200 and programming environment 100, textual interface environment 102, editor 104, interpreter/compiler 106 and/or programming language 108, based on the stored instructions.

Optionally, computing device 200 may include multiple CPUs for executing software loaded in memory 210, and other programs for controlling system hardware. Each of the CPUs can be a single or a multiple core processor. The code loaded in memory 210 may run in a virtualized environment, such as in a Virtual Machine (VM). Multiple VMs may be resident on a single processor. Also, part of the application could be run in hardware, for example, by configuring a field programmable gate array (FPGA), using an application specific instruction set processor (ASIP) or creating an application specific integrated circuit (ASIC). Further, the part of the applications may be run on analog electronic devices or other resources may be used to run part of the application, such as graphics processing units (GPUs) or dedicated hardware such as Fast Fourier Transform (FFT) processing blocks.

Storage 212 may contain software tools for applications. Storage 212 can include code 214 for the operating system (OS) of device 200, code 216 for applications running on the operation system including the applications for textual interface environment 102, editor 104, interpreter/compiler 106 and/or programming language 108 and data 218 generated from textual interface environment 102, editor 104, interpreter/compiler 106 and/or programming language 108. Parts of the applications can be stored in the CPU cache or memory 210 as well, much like the data, and even the OS, or they can be stored on the network.

Input control 208 may interface with keyboard 220, mouse 222, microphone 224, camera 226, such as a web camera, or other input devices such as, for example, a motion based input device. Computing device 200 may receive, through input control 208, input data, such as the input data for developing a model. Computing device 200 may display on display 202 user interfaces for displaying the data generated from textual interface environment 102, editor 104, interpreter/compiler 106 and/or programming language 108.

Figure 3:
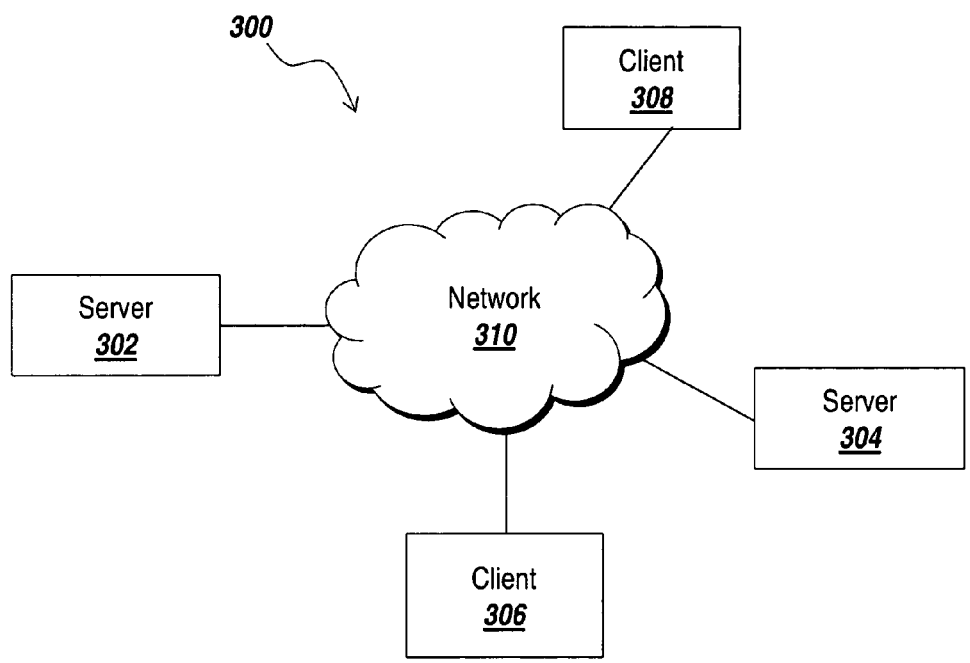
FIG. 3 illustrates an exemplary distributed system suitable for practicing a distributed implementation of an exemplary embodiment.

FIG. 3 is an exemplary distributed system 300 suitable for practicing a distributed implementation of an exemplary embodiment. Distributed system 300 may include one or more servers 302 and 304 coupled to clients 306 and 308 via a communication network 310. Network interface 206 of computing device 200 enables servers 302 and 304 to communicate with clients 306 and 308 through communication network 310. Communication network 310 may include Internet, intranet, Local Area Network (LAN), Wide Area Network (WAN), Metropolitan Area Network (MAN), wireless network (e.g., using IEEE 802.11, IEEE 802.16, and Bluetooth), etc. In addition the network may use middleware, such as Common Object Request Broker Architecture (CORBA) or Distributed Component Object Model (DCOM) to allow a computer on the network to communicate directly with another computer or device that is connected to the network. The communication facilities can support the distributed implementations of the exemplary embodiments. Exemplary embodiments may also employ remote procedure call (RCP) and/or remote method invocation (RMI).

In distributed system 300, servers 302 and 304 may provide clients 306 and 308 with software components or products under a particular condition, such as a license agreement. The software components or products may include those for providing programming environment 100 and/or implementations of code for select elements. The software components or products may also include those for textual interface environment 102, editor 104, interpreter/compiler 106 and/or programming language 108coupled to the programming environment 100.

In one example, client 308 may perform the modeling of a dynamic system using a software component provided by server 304 and send server 304 the model for simulation. Server 304 may return the simulation results to client 308 and client 308 may subsequently display the data to the user with the information on the data.

In another example, client 308 may include programming environment 100 and may desire additional implementations of source code listing. Client 308 may have implementations of code that are already loaded on client 308 or may have to download each implementation of code that client 308 desires. In either case, server 304 may store implementations of code that the user can download. The user may be charged a fee to download the implementation of code. The implementation of code may be specialized code that provides an advantage over an implementation of code client 308 already has.

In another example, client 308 can access server 302 and/or 304 to access a repository of implementations of code. The implementations of code in the repository can be maintained and updated by an administrator. The repository can serve as a central location to access implementations of code for clients 306 and 308. The clients may also be able to upload implementations of code to the repository. Alternatively, clients 306 and 308 can access the repository of implementations of code via a network such as the Internet to download or upload implementations of code. The implementations of code may be put under version control in the repository and may have information as well as index terms associated with them. The information can be text or any other format for information storage such as the eXtended Markup Language (XML).

In addition, implementations consistent with principles of the disclosure can be implemented using devices and configurations other than those illustrated in the figures and described in the specification without departing from the spirit of the invention. Devices and/or components may be added and/or removed from the implementations of FIGS. 1-3 depending on specific deployments and/or applications. Further, disclosed implementations may not be limited to any specific combination of hardware and/or software.

III. Exemplary Embodiments

In exemplary embodiments, an editor, such as editor 104, may be used to create or edit a source code listing. The source code listing may include one or more statements including metadata preceded by a specific designator, such as a combination of characters (e.g., %#). These statements enable a user to specify the type of external content to be output along with the source code listing. The statements may be a non-executable portion of the source code listing before and after the compilation of the source code listing. For example, the statements may consist of a non-executable string including metadata identifying the external content.

In an embodiment, a user may use the statements to provide display specifications describing how the external content should be output, such as by specifying dimensions of a display frame, a display window or dimensions of a user interface. The source code listing may be compiled or interpreted to generate the executable source code listing. When the executable source code listing is executed, the metadata, i.e. the statements preceded by the specific designator may not be outputted. Rather, the external content identified by the metadata can be output. According to one option, there may be an auxiliary code listing that scans the source code listing for statements preceded by the specific designator. When the statements are found, the auxiliary code may output the external content referred by the statements. Exemplary embodiments discussed below first illustrate a general case in FIGS. 4A-5. Exemplary embodiments also illustrate specific examples including various types of external content, such as a text file, an audio file, a video file, an image and a webpage, in FIGS. 6A-10B.

External content can refer to a source of information that can be output in the source code listing. The external content may be located outside of the source code listing. The source code listing can contain one or more statements including metadata that refer to one or more portions of external content that can be output in the source code listing. External content may help to explain the source code listing, may give feedback to the programmer to improve the editing of the source code listing, etc. Examples of external content may include, but are not limited to, a really simple syndication (RSS) feed, a text file, an audio file, a video file, an image, an animation (e.g. GIF file or AdobeFlash™ file), a webpage, a hyperlink, results of programming commands (e.g., results of executing a function), profiler results (e.g., performance data), M-Code, a movie, graphical models (e.g., a Simulink® model), extensible mime-type, graphical output from LaTeX language inline, help documents explaining programming commands, M-Lint results, etc.

In an embodiment, the metadata, i.e. the statements of the source code listing, that refer to external content are non-executable parts of the source code listing. The external content may be non-executable or may include a non-executable portion such as an image or a static webpage. Alternatively, the external content itself may be executable or may include an executable portion. For example, external content may include an executable graphical model that when executed generates a graphical plot that shows the behavior of a modeled system. The executable model may be referenced in a source listing via a symbol that identifies a non-executable portion of the source code, i.e. the metadata. The metadata may include a name, link, etc., for the executable model. Alternatively, the metadata may include the graphical model itself. The metadata may also include a graphical plot for the executable model.

Figure 4A:
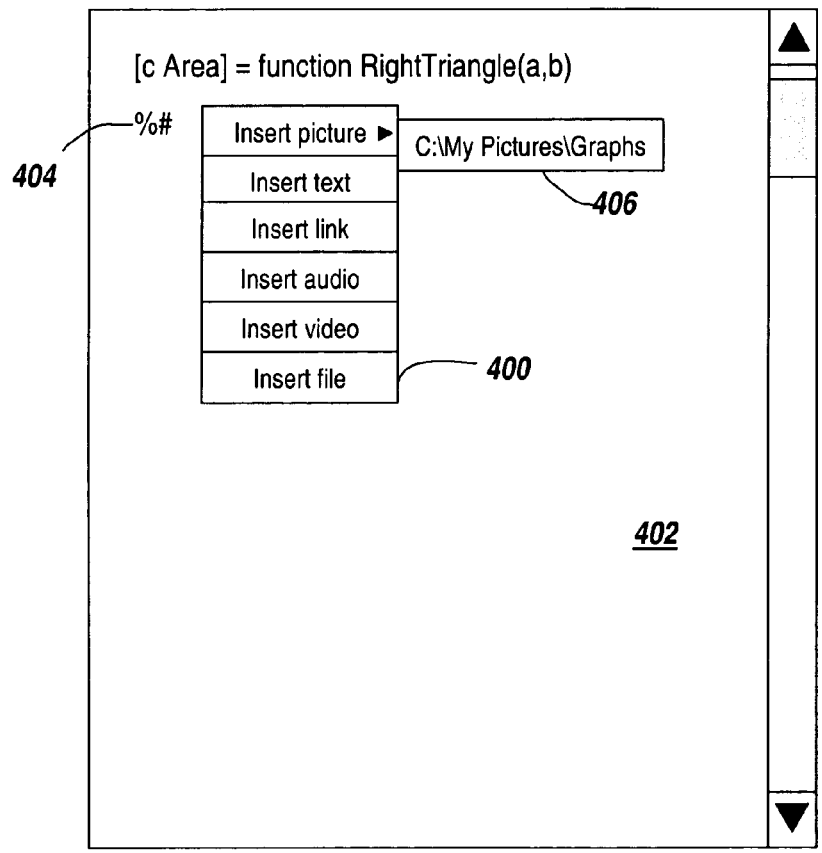
FIG. 4A illustrates an exemplary embodiment in which an editor can present information to a user via an exemplary menu.

FIG. 4A illustrates an exemplary embodiment in which an editor that can present information to a user via exemplary menu 400. Menu 400 contains external content that can be inserted into the source code listing. Menu 400 is accessible from editor window 402. Upon detecting designator 404, i.e. the combination of characters "%#", the editor may display menu 400 to the user. The user may select one of the items on menu 400. Menu 400 may provide the user with menu items identifying a location where the external content is stored. In the example illustrated in FIG. 4A, menu 400 includes menu item 406 that identifies where the image files are stored (i.e., C:\My Pictures\Graphs). Alternatively, menu 400 may display the contents of the location using small icons to provide the user with the previews of the available media files under the selected menu item. Yet in another embodiment, menu 400 may have a browse option that allows the user to browse through the files on the computer to specify the location where the external content is stored. For the example illustrated in FIG. 4A, the user may first select the C drive, then under the My Pictures folder, the user may select the Graphs file.

Figure 4B:
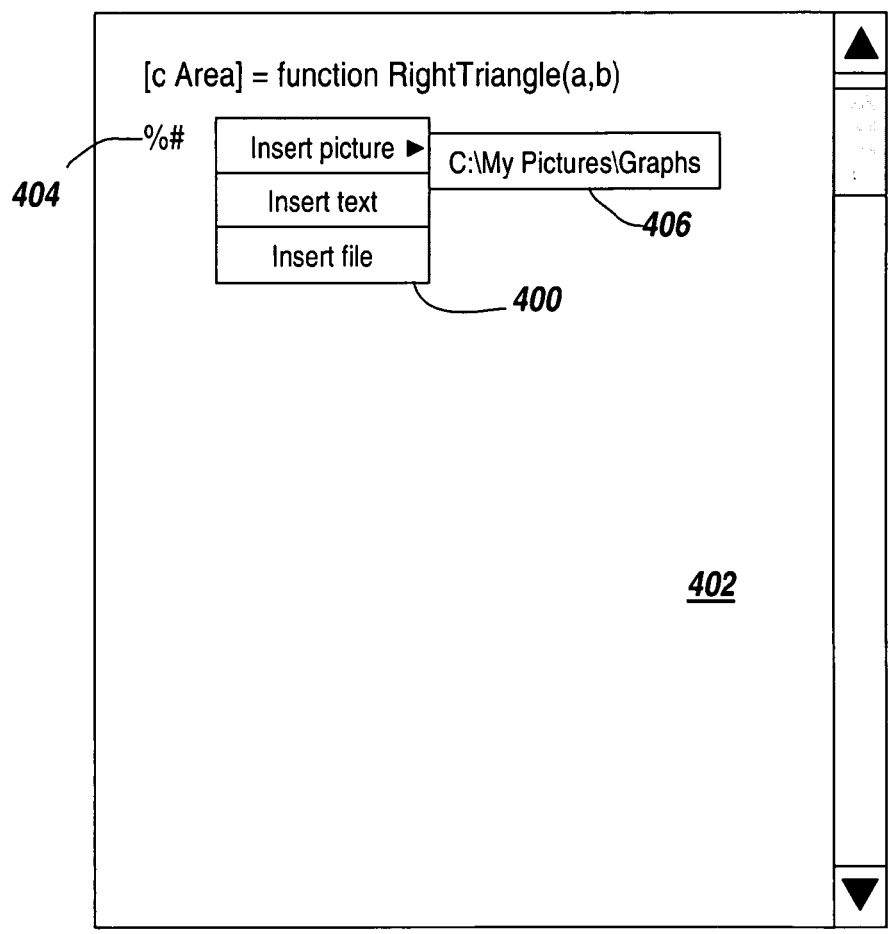
FIG. 4B illustrates an exemplary embodiment in which the exemplary menu includes items chosen by the editor.

FIG. 4B illustrates an exemplary embodiment in which the exemplary menu 400 includes items chosen by the editor. The editor may be able to recognize the content of the source code listing and display menu items that are relevant to the source code listing. For example, in FIG. 4B, the editor recognizes that the source code listing concerns a function. The editor then displays three options including picture, text or file, such as a help file. The editor may make this selection by matching the function with a list of external content types that were previously associated with this function or that are compatible with the function (e.g., an external file may include a plot that illustrates an output produced when the function is executed with particular input parameters). The editor may include intelligent logic that scans the source code listing to determine which types of external content may be appropriate. For example, the intelligent logic can determine that the source code listing is configured to operate on an array. Accordingly, when the user enters a symbol that identifies external content, the system may provide the user with a menu that shows external content that is appropriate for use with an array, e.g., the external content may include an array, the external content may display information included in an array, instructions for interacting with the array, etc.

Alternatively, the editor may include a learning mechanism, such as an artificial intelligence mechanism, that learns the user's preferences based on the user's activities. For example, the learning mechanism may monitor a user's previous ten interactions with the editor. The learning mechanism may use information from the previous ten interactions to determine likely pieces of external content that are compatible with source code in the source listing and that likely to be desired by the user based on the user's previous interactions with the editor. For example, if in the past, the user has only inserted an image when using a particular function in the source code, the editor may only display an image option that allows the user to access the image.

Figure 4C:
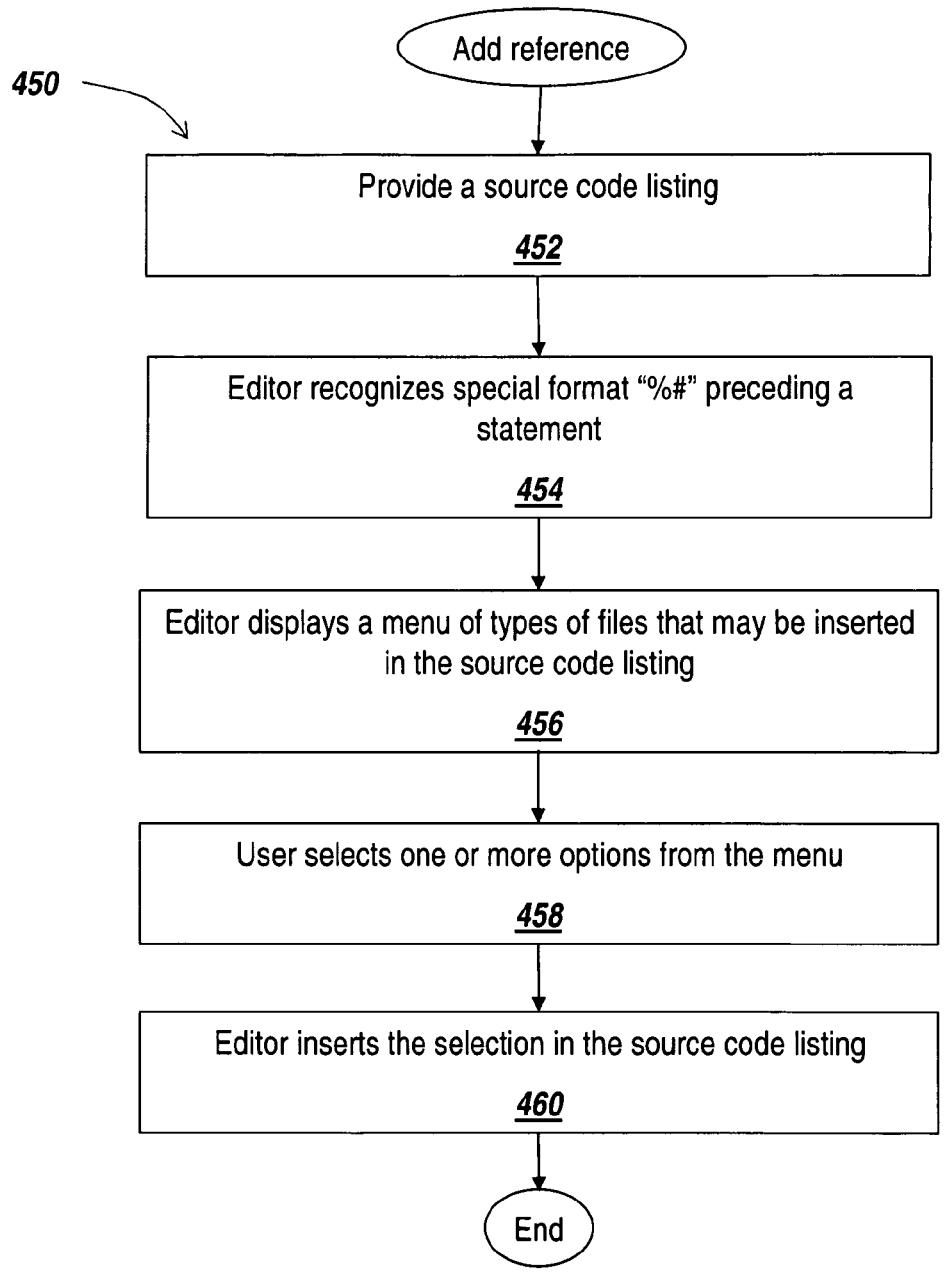
FIG. 4C is a flowchart illustrating exemplary processing for outputting a reference as illustrated in FIG. 4A.

FIG. 4C is a flowchart 450 illustrating exemplary processing for outputting a reference as illustrated in FIG. 4A. Initially, a source code listing is provided by the editor (step 452). The editor recognizes a designator, such as characters "%#", preceding a statement (step 454). The editor displays a menu 400 of types of content that may be inserted in the source code listing (step 456). The user may select one of the displayed options (step 458). The editor may insert the selected content in the source code listing (step 460).

Figure 5:
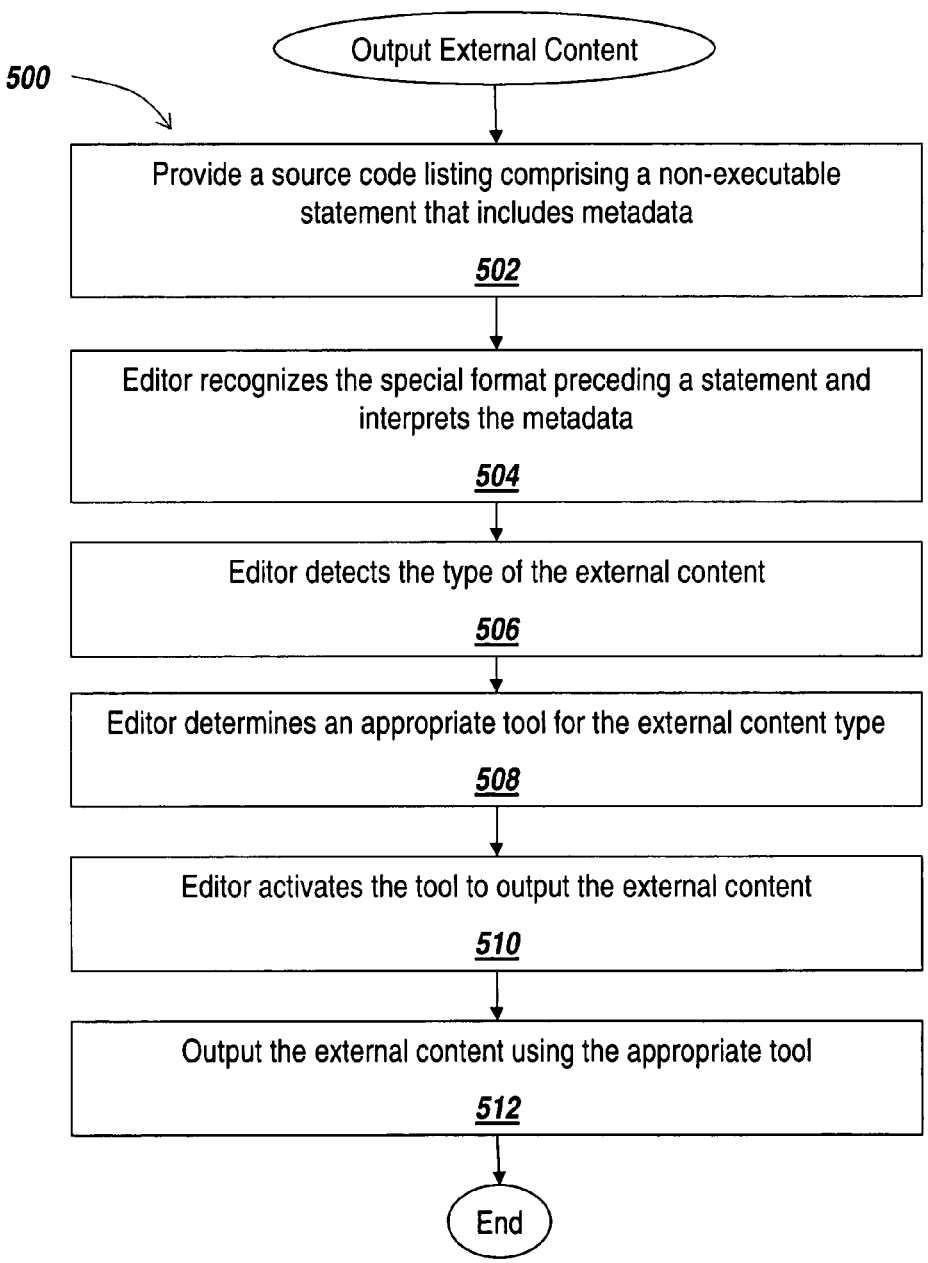
FIG. 5 is a flowchart illustrating exemplary processing for outputting external content as a comment.

FIG. 5 is a flowchart 500 illustrating exemplary processing for outputting external content as a comment. A source code listing is provided (step 502). The source code listing includes at least one non-executable statement. The non-executable statement may include metadata that identifies one or more external contents. Alternatively, the metadata may access the one or more external contents. In another embodiment, the metadata may interact with the one or more external contents. The editor recognizes the designator preceding the statement (step 504) in the source code listing provided in step 502 and interprets the metadata. Logic, such as a module, may be provided in the system to recognize the designator. The module may operate to detect types of acceptable external content. The editor may then detect the type of the external content, e.g., really simple syndication (RSS) feed, text, image, audio, video, etc. (step 506). The editor may determine an appropriate tool to output the external content type (step 508). The editor may activate the determined tool to output the external content (step 510). The editor can output the external content using an appropriate tool rather than displaying the metadata (step 512). The external content may be stored at a storage location that is accessible to the editor. The external content also may be stored online, on a website. The external content may be output at the editing stage, without requiring the source code listing to be compiled or interpreted.

FIG. 6A illustrates an exemplary embodiment in which a text file is displayed along with the source code listing. The text file is the external content that is to be displayed along with the source code listing.

FIG. 6A shows the source code listing containing comment statement 600 and instruction 602. The source code listing is displayed in window 604 of an editor. The editor is processing the following text of a source code listing:

% Display a text file that can
% be maintained separate from
% the source code listing:
%# m: type Explanation.txt
x=z*y+z^2;

This source code listing contains the statement "%# m: type Explanation.txt". The editor can determine that it should process the metadata rather than ignore the statement because of the presence of the designator "%#". The character "m" indicates that code follows the "m" character. In this example, the code "type Explanation.txt" is a command to output the contents of the text file "Explanation.txt". The contents of the text file are displayed in inline scrollable text area 606. The text file "Explanation.txt" contains the text "This is an example of an equation with three unknowns," and this content is displayed in the inline scrollable text area 606. Inline scrollable text area 606 is shown overlaying editor window 604. Nevertheless, the content may also be displayed in a window that does not overlay editor window 604.

When "%# m: type Explanation.txt" appears in the source code, the editor interprets the metadata and instead of merely displaying the metadata, the editor displays the content of the file identified by the metadata. The statement is automatically ignored by compilers or interpreters because the statement is viewed as a comment by the compilers and interpreters.

The editor may have a separate thread, such as an auxiliary code, that scans the source code listing for metadata, i.e. specially designated statements, like those containing "%#". If such a statement is found, the editor may display the contents of the file referenced by the metadata, instead of displaying the comment statement as part of the source code listings.

Figure 6B:
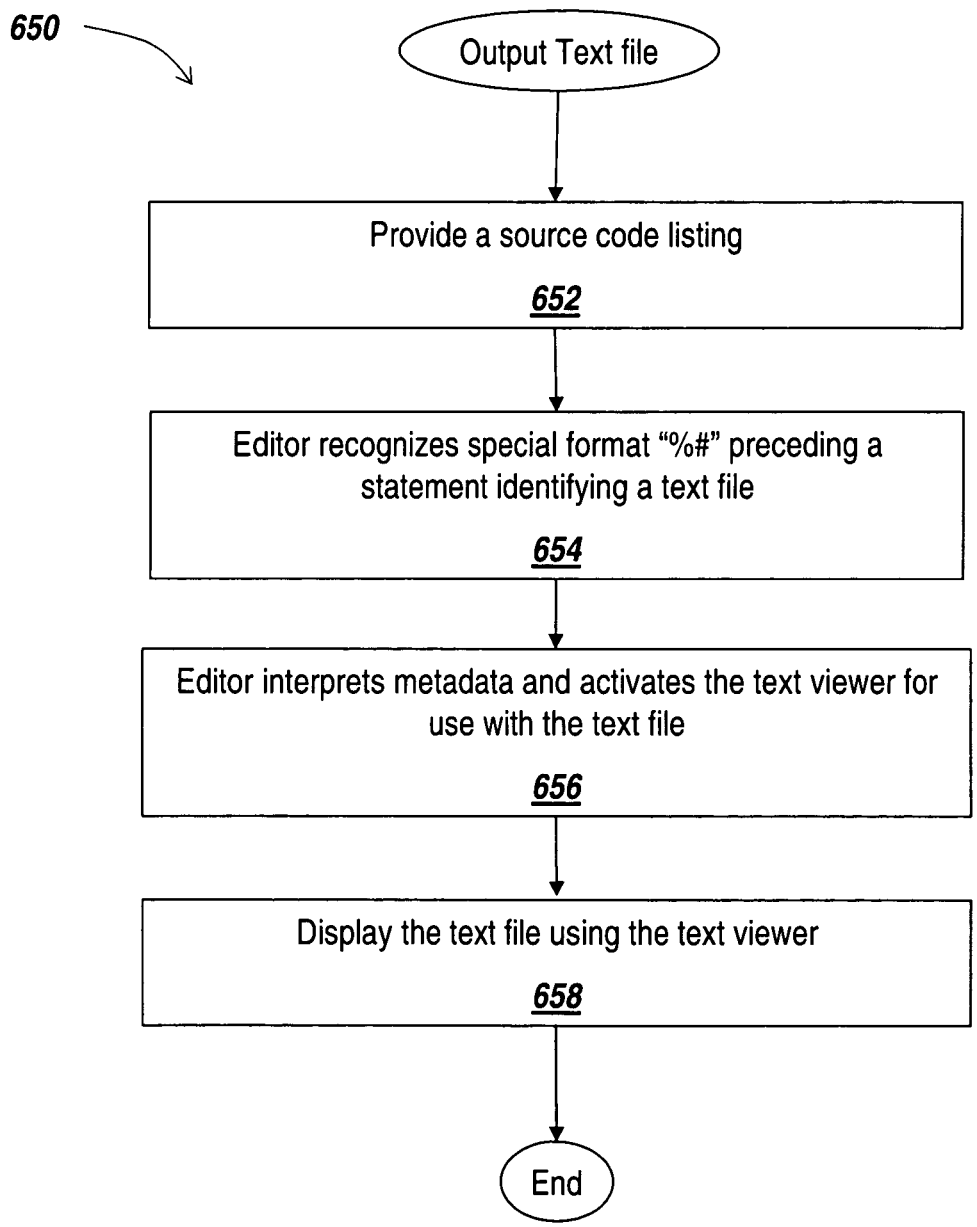
FIG. 6B is a flowchart illustrating exemplary processing displaying a text file as illustrated in FIG. 6A.

FIG. 6B is a flowchart 650 illustrating exemplary processing displaying a text file, as illustrated in FIG. 6A. Initially, a source code listing is provided (step 652). The editor recognizes a designator, such as characters "%#", in a statement identifying or referring to a text file (step 654). The editor interprets the metadata and activates a text viewer for use with the text file, such as illustrated in FIG. 6A (step 656). The editor may make a call to the text viewer to display the contents of the text file and may instruct the text viewer about where to display the inline scrollable text area. The text file is then displayed using the text viewer (step 658).

In some embodiments, the user may specify the dimensions of inline scrollable text area 606. For example, the user may specify the dimensions of the height and/or the width of inline scrollable text area 606 within the text of the comment statement.

Figure 7A:
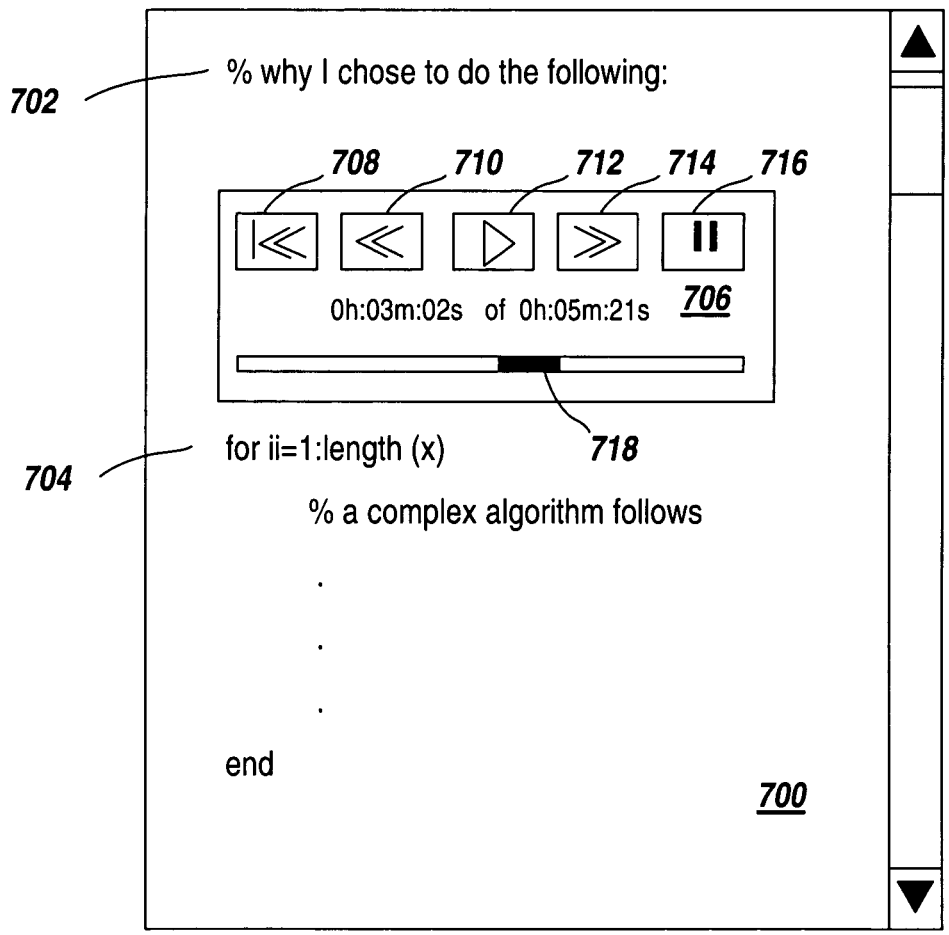
FIG. 7A illustrates an exemplary embodiment in which an audio clip is output along with the source code.

The source code listing also may contain other types of external content. One example of another type of external content is audio content. FIG. 7A illustrates an exemplary embodiment in which an audio clip is output along with the source code. In FIG. 7A, the editor is processing the following source code listing:

% Why I chose to do the following
%# media: AlgorithmExplanation.wav for ii=1:length(x)
% a complex algorithm follows
.
.
.
end The source code listing contains the statement "%# media: AlgorithmExplanation.wav." This statement is preceded by the characters "%#" and thus, is processed by the editor. The use of "media" in the statement indicates a reference to external media content. In this example, the external content is a "wav" file holding audio content. The editor recognizes the file as an audio file and activates an audio player for playing the content of the audio file.

As can be seen FIG. 7A, editor window 700 displays source code 702 and 704. Editor window 700 also displays audio player user interface 706 that is provided by the audio player. Audio player user interface 706 contains a rewind to beginning button 708, rewind button 710, play button 712, fast forward button 714 and stop/pause button 716. Buttons 706, 708, 710, 712, 714 and 716 are activatable by the user to realize the associated functionality. Audio player user interface 706 may further include slider 718 that enables the user to adjust the portion of the audio file to be played. A value of slider 718 may also be dynamically displayed as text on audio player user interface 706.

As illustrated in FIG. 7A, the editor may display comment statements 702 without the specific designator, i.e. comment statements indicated only with the symbol "%", as a regular comment. Comment statement "% a complex algorithm follows" is a simple comment statement, provided with the generic comment format, i.e. followed by the symbol "%". Accordingly, the text of this comment statement may be displayed in editor window 700. Similarly, comment statement "% Why I chose to do the following" may be displayed as text because this comment statement is not interpreted as metadata since this comment statement is not preceded by a specific designator, i.e., the combination of symbols "%#".

Figure 7B:
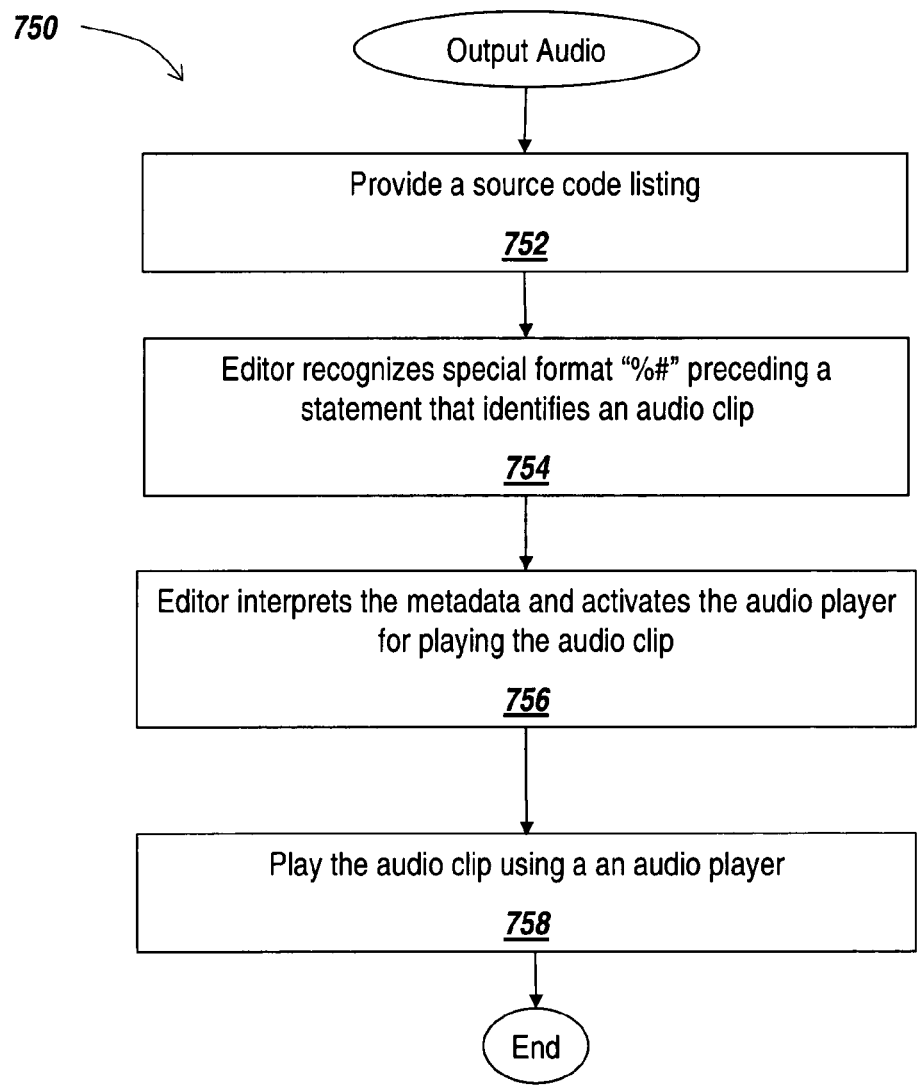
FIG. 7B is a flowchart illustrating exemplary processing for playing an audio clip as illustrated in FIG. 7A.

FIG. 7B is a flowchart 750 illustrating exemplary processing for playing an audio clip as illustrated in FIG. 7A. Initially, a source code listing is provided by the editor (step 752). The editor recognizes a specific designator, such as characters "%#", preceding a statement in the source code listing that identifies an audio clip (step 754). The editor interprets the metadata and activates the audio player for playing the audio clip (step 756). The user may then interact with the audio player to play the audio clip using the audio player (step 758).

Figure 8A:
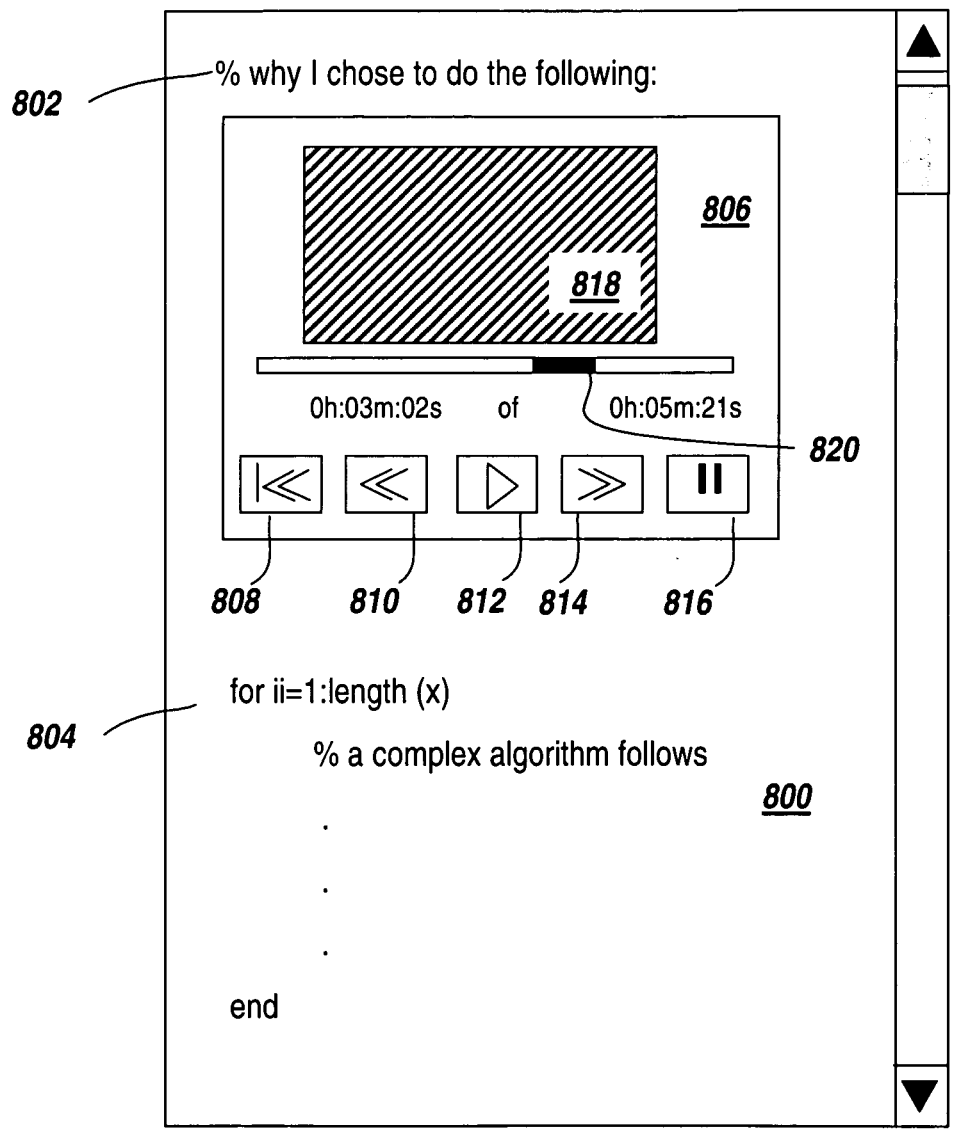
FIG. 8A illustrates an exemplary embodiment in which a video clip is output along with the source code.

The source code listing may also contain other types of external content. One example of another type of external content is video content. FIG. 8A illustrates an exemplary embodiment in which a video clip is output along with the source code. In FIG. 8A, the editor is processing the following source code listing:

% Why I chose to do the following
%# media: AlgorithmExplanation.mov for ii=1:length(x)
% a complex algorithm follows
.
.
.
end The source code listing contains the statement "%# media: AlgorithmExplanation.mov." This statement is preceded by the characters "%#" and thus, the metadata is interpreted by the editor. The use of "media" in the statement indicates a reference to external media content. In this example, the external content is a "mov" file holding video content. The editor recognizes the file as a video file and activates a video player for playing the content of the video clip.

In FIG. 8A, editor window 800 displays a source code listing containing comment statement 802 and other programming statements 804. Editor window 800 also displays video player user interface 806. Video player user interface 806 contains rewind to the beginning button 808, rewind button 810, play button 812, fast forward button 814 and stop/pause button 816. Buttons 808, 810, 812, 814 and 816 are can be activated by the user to realize the desired functionality. Video player user interface 806 also displays a screen 818 for outputting the video content. Video player user interface 806 may further include slider 820 that enables the user to adjust the portion of the video file to be played. A value of slider 820 may also be dynamically displayed as text on video player user interface 806.

Figure 8B:
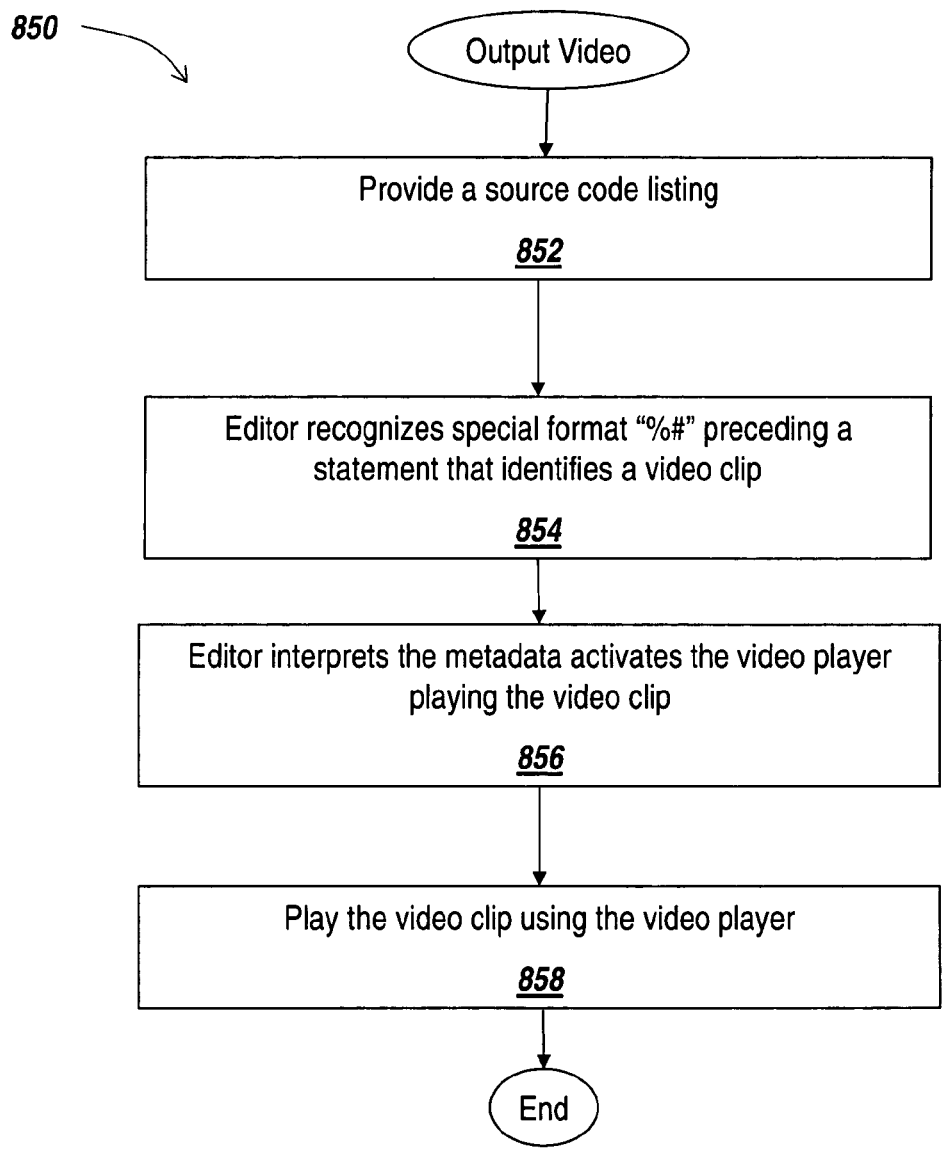
FIG. 8B is a flowchart illustrating exemplary processing for playing a video clip as illustrated in FIG. 8A.

FIG. 8B is a flowchart 850 illustrating exemplary processing for playing a video clip as illustrated in FIG. 8A. Initially, a source code listing is provided by the editor (step 852). The editor recognizes a specific designator, such as characters "%#" preceding a statement of the source code listing that identifies a video clip (step 854). The editor interprets the metadata and activates a video player for playing the video clip (step 856). The user may then interact with the video player to play the video clip using the video player (step 858).

Figure 9A:
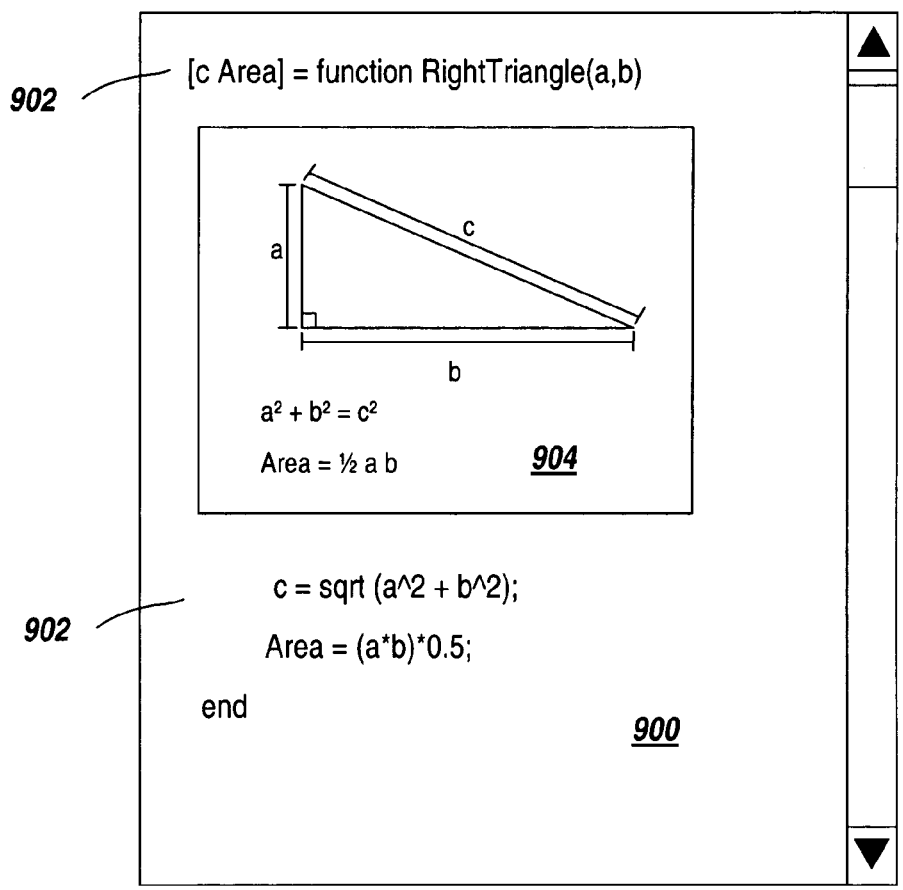
FIG. 9A illustrates an exemplary embodiment in which an image file is displayed along with the source code.

The source code listing may also contain other types of external content. One example of another type of external content is image content. FIG. 9A illustrates an exemplary embodiment in which an image file is displayed along with the source code. In FIG. 9A, the editor is processing the following source code listing:

[c Area]=function RightTriangle (a,b)
%# html:<img src="./RightTriangleEquations.jpg"></img>
c=sqrt(a^2+b^2);
Area=(a*b)*.5;
end The source code listing contains the statement "%# html: <img src="./RightTriangleEquations.jpg"></img>". This statement is preceded by the characters "%#" and thus, the metadata is interpreted by the editor. The use of "html" in the statement indicates a reference to external content encoded in the HyperText Markup Language (HTML). In this example, the external content is an "img" file holding image content. The editor recognizes the file as a locally stored image file and activates an image viewer for displaying the content of the image file.

In FIG. 9A, editor window 900 displays a source code listing containing instructions 902. Image 904 is overlayed on editor window 900.

In one embodiment, the file to be displayed may not be stored locally. The user may refer to a non-local file via a Uniform Resource Locator (URL). For example, the editor may process the following source code listing:

[c Area]=function RightTriangle (a,b)
%# html:<img src="http://www.mathworks.com/RightTriangleEquations.jpg"></img>
c=sqrt(a^2+b^2);
Area=(a*b)*.5;
end This source code listing refers to an image that is located on a website. When the statement "%# html:<img src=http://www.mathworks.com/RightTriangleEquations.jpg"></img>" appears in the source code listing, the editor may retrieve the image stored in the RightTriangleEquations.jpg file, located on the www.mathworks.com website. Alternatively, other types of files, such as movie clips, audio clips, and the like, located on a website may be incorporated in the source code listing using non-executable lines in the source code listing.

Figure 9B:
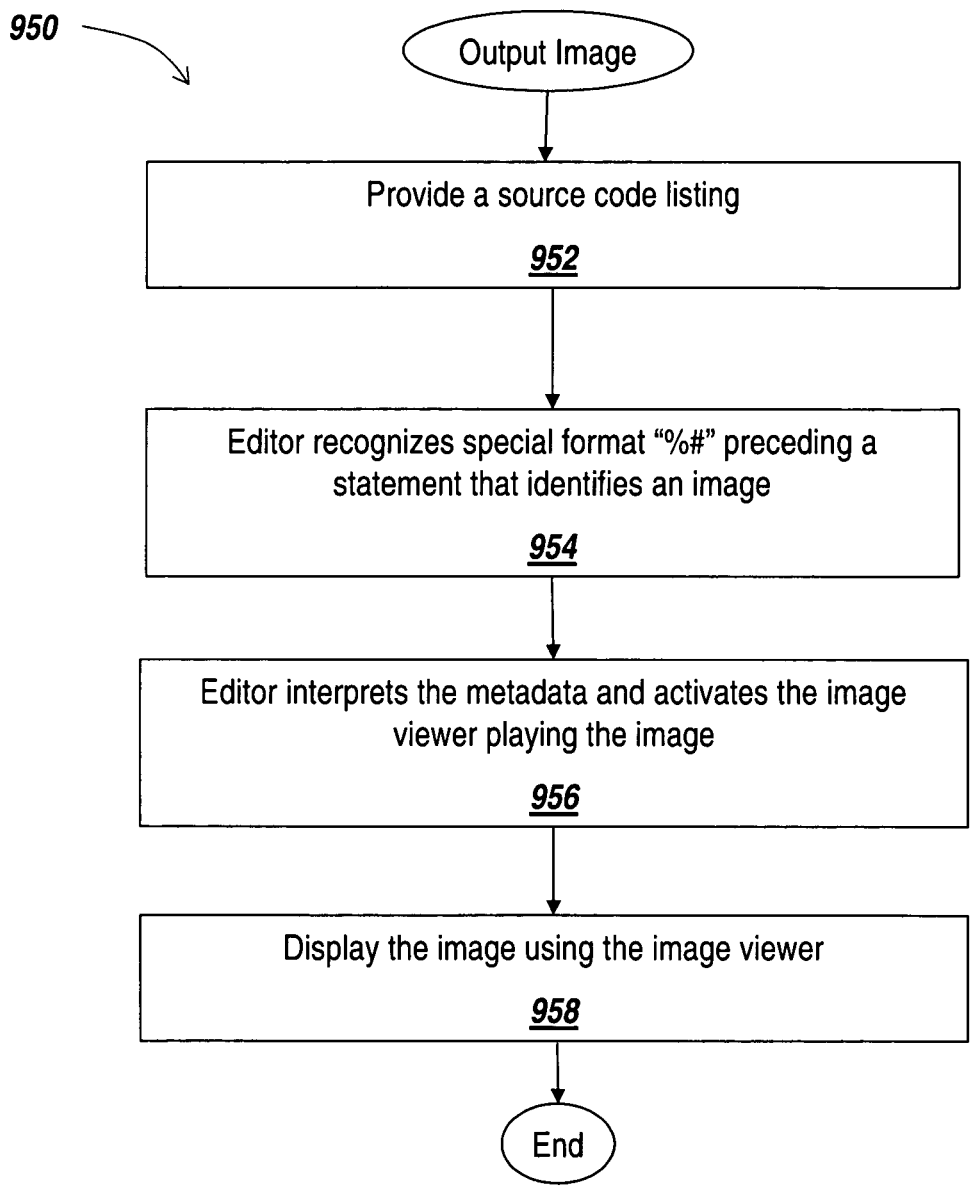
FIG. 9B is a flowchart illustrating exemplary processing for displaying an image file as illustrated in FIG. 9A.

FIG. 9B is a flowchart 950 illustrating exemplary processing for displaying an image file as illustrated in FIG. 9A. Initially, a source code listing is provided by the editor (step 952). The editor recognizes a specific designator, such as characters "%#" preceding a statement of the source code listing that identifies an image (step 954). The editor interprets the metadata and activates an image viewer for displaying the image (step 956). The user may then interact with the image viewer to display the image using the image viewer (step 958).

Figure 10A:
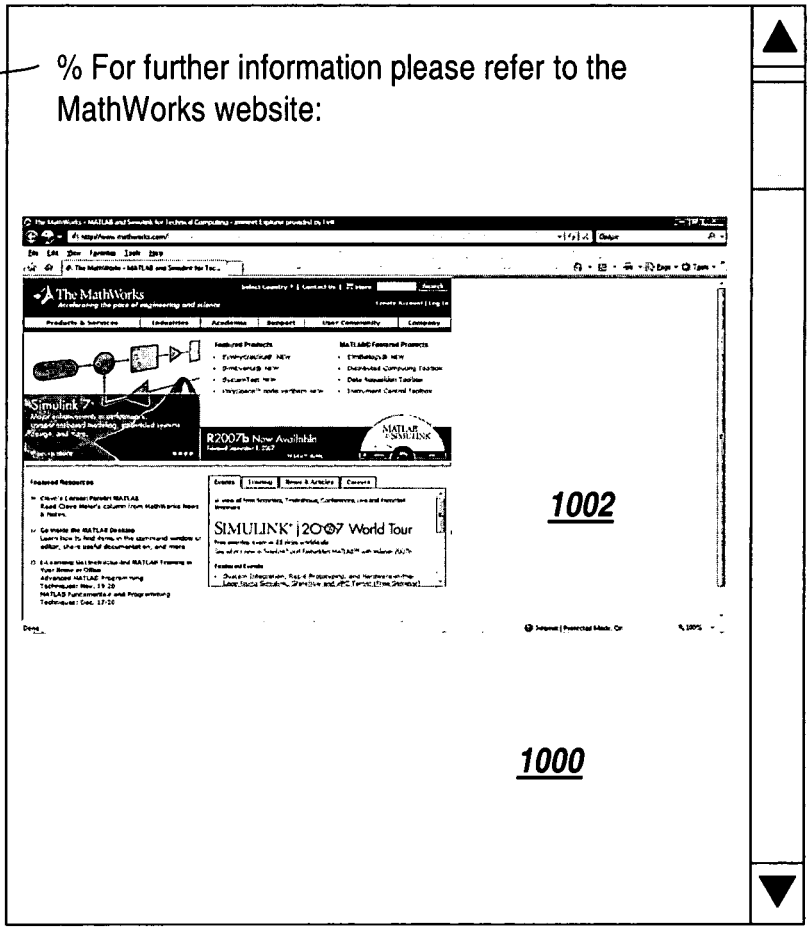
FIG. 10A illustrates an exemplary embodiment in which a webpage is displayed along with the source code.

In some exemplary embodiment, the external content may be a webpage. The source code listing may refer to the webpage by specifying a URL. FIG. 10A illustrates an exemplary embodiment in which a webpage is displayed along with the source code. In FIG. 10A, the editor is processing the following source code listing:

% For further information, please refer to the MathWorks website:
%# m: web('http://www.mathworks.com')
end The source code listing contains the statement "%# m: web('http://www.mathworks.com')". This statement is preceded by the characters "%#" and thus, is processed by the editor. The use of "web" in the statement indicates a reference to external webpage content. In this example, the external content is the webpage "http://www.mathworks.com". The editor recognizes the file as a webpage and activates a webpage viewer as an inline scrollable area with the rendered HTML for displaying the content of the webpage. The webpage may include a variety of files such as movie clips, audio clips, and the like.

Figure 10B:
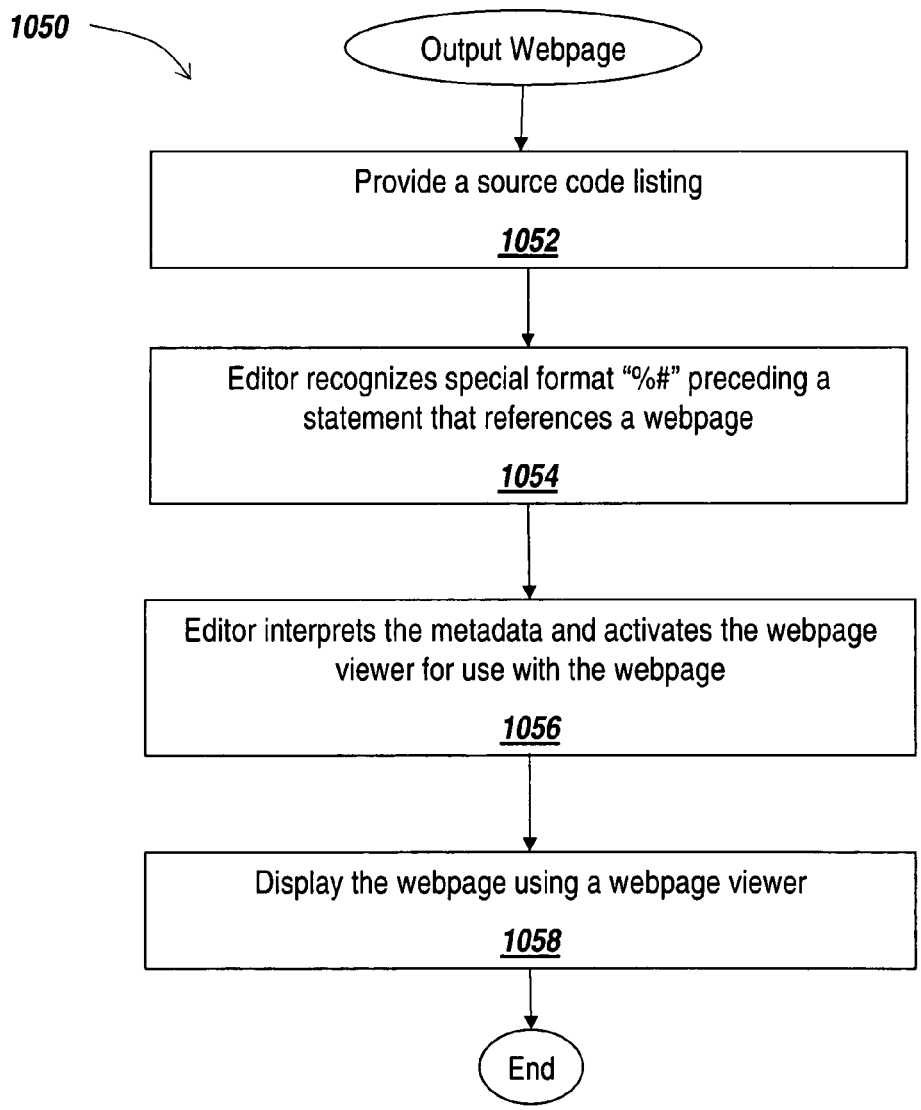
FIG. 10B is a flowchart illustrating exemplary processing for displaying a webpage as illustrated in FIG. 10A.

FIG. 10B is a flowchart 1050 illustrating exemplary processing for displaying a webpage as illustrated in FIG. 10A. Initially, a source code listing is provided by the editor (step 1052). The editor recognizes a specific designator, such as characters "%#", preceding a statement of the source code listing that references a webpage (step 1054). The editor interprets the metadata and activates a webpage viewer, such as a browser, for displaying the webpage (step 1056). The user may then interact with the webpage viewer to display the webpage using a webpage viewer (step 1058).

The external content incorporated in the source code listing may include other types of content. Examples include, but are not limited to, results of programming commands, such as results of executing a function; profiler results, such as performance data; M-Code; graphical models, such as a Simulink® model; extensible mime-type; LaTeX language inline; help documents explaining programming commands and M-Lint results.

Alternatively, text, images, animation (e.g. GIF file or AdobeFlash™ file), media and other files could be stored in a database and a specialized comment type could be designed to access it. The specialized statement may specify the database (server) where the file is stored, the protocol (JDBC/ODBC) to access the database, the username and password required by the database, the query to obtain the file and the type of the file. Specifying these elements would enable an integrated development environment (IDE) to appropriately render the file.

Various embodiments discussed above may be implemented in a technical computing environment. The technical computing environment may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, the technical computing environment may include a dynamically typed language that can be used to express problems and/or solutions in mathematical notations familiar to those of skill in the relevant arts. For example, the technical computing environment may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

The technical computing environment may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

The technical computing environment may further provide mathematical functions and/or graphical tools (e.g., for creating plots, surfaces, images, volumetric representations, etc.). In one implementation, the technical computing environment may provide these functions and/or tools using toolboxes (e.g., toolboxes for signal processing, image processing, data plotting, parallel processing, optimization, etc.). In another implementation, the technical computing environment may provide these functions as block sets (e.g., an optimization block set). In still another implementation, the technical computing environment may provide these functions in another way, such as via a library, etc. The technical computing environment may be implemented as a text based environment, a graphically based environment, or another type of environment, such as a hybrid environment that is both text and graphically based.

An alternative embodiment may implement the technical computing environment using one or more text-based products. For example, a text-based technical computing environment may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. The text-based technical computing environment may support one or more commands that support remote processing using one or more user environments.

Another alternative embodiment may implement the technical computing environment in a graphically-based technical computing environment using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment. The graphically-based TCE may support remote processing using one or more user environments.

V. Conclusion

Implementations may provide devices and techniques that output a source code listing and an external content, such as an image, an audio clip, a video clip or a webpage, on a text editor. The external content may provide additional information or explanation about the source code listing. The external content may further provide and output of the source coed listing. The external content is accessed by a non-executable statement in the source code listing.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4C, 5, 6B, 7B, 8B, 9B and 10B, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-10B depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and subheadings used herein are to aid the reader and are not intended to characterize or limit the scope of embodiments of the invention.

The scope of the invention is defined by the claims and their equivalents.

What is claimed is:

1. One or more non-transitory computer readable storage media storing executable instructions that when executed by processing logic cause the processing logic to:
   create a source code listing in an editor;
   receive an input, wherein the input includes a designator, and wherein the designator identifies a non-executable statement to be inserted into the source code listing;
   display an interface proximate to the designator, wherein:
      the interface includes an external content identifier,
      the external content identifier indicates a location of external content,
      the external content identifier is associated with metadata, and
      the metadata is used to access the external content using the non-executable statement;
   receive the metadata based on the external content identifier being selected; and
   insert the metadata into the source code listing proximate to the designator, wherein the designator and the metadata form the non-executable statement in the source code listing.

2. The one or more non-transitory computer readable storage media of claim 1, further storing executable instructions that when executed by processing logic cause the processing logic to:
   retrieve the external content from the location.

3. The one or more non-transitory computer readable storage media of claim 1, wherein the external content comprises a really simple syndication (RSS) feed, an image, a video clip or an audio clip.

4. The one or more non-transitory computer readable storage media of claim 1, wherein the external content is an image that is displayed in the source code listing.

5. The one or more non-transitory computer readable storage media of claim 1, wherein:
   the external content is a video clip or an audio clip, and
   the source code listing displays a user interface element that plays the video clip or the audio clip when the user interface element is activated.

6. The one or more non-transitory computer readable storage media of claim 1, wherein the non-executable statement including the metadata is a comment statement in the source code listing.

7. One or more non-transitory computer readable storage media storing executable instructions that when executed by processing logic cause the processing logic to:
   interact with a source code listing that includes a non-executable statement, wherein the non-executable statement comprises a designator and metadata;
   evaluate the metadata based on identifying the designator to determine an external content identifier in the metadata;
   locate external content based on the external content identifier in the metadata; and
   output the external content and the source code listing on an editor, wherein:
      the external content identifier indicates a location of the external content,
      the external content identifier is associated with the metadata, and
      the metadata is used to access the external content using the non-executable statement.

8. The one or more non-transitory computer readable storage media of claim 7, wherein the non-executable statement comprises display specifications for outputting the external content on the editor.

9. The one or more non-transitory computer readable storage media of claim 7, wherein the external content comprises one or more of a really simple syndication (RSS) feed, an image, an audio clip or a video clip.

10. The one or more non-transitory computer readable storage media of claim 7, wherein the external content is associated with a uniform resource locator (URL).

11. The one or more non-transitory computer readable storage media of claims 7, further storing executable instructions that when executed by processing logic cause the processing logic to:
   display, using the editor, the external content embedded in the source code listing based on the metadata.

12. One or more non-transitory computer readable storage media storing executable instructions that when executed by processing logic cause the processing logic to:
   provide a source code listing including a non-executable statement, wherein the non-executable statement includes metadata for communicating with external content;
   scan the source code listing using an auxiliary code;
   identify the metadata based on scanning the source code listing, wherein the identifying includes detecting a designator of the metadata, and wherein the metadata is associated with the non-executable portion statement of the source code listing; and
   output the source code listing and the external content on an editor when the metadata is identified, wherein outputting the external content includes locating the external content based at least in part on an external content identifier in the metadata, and wherein:
      the external content identifier indicates a location of the external content,
      the external content identifier is associated with the metadata, and
      the metadata is used to access the external content using the non-executable statement.

13. The one or more non-transitory computer readable storage media of claim 12, wherein the external content comprises one or more of a really simple syndication (RSS) feed, an image, a video clip or an audio clip.

14. The one or more non-transitory computer readable storage media of claim 12, further storing executable instructions that when executed by processing logic cause the processing logic to:
   communicate with the external content from the source code listing; and
   display, using the editor, the external content embedded in the source code listing.

15. A system comprising:
a programming editor configured to:
   create creating a source code listing;
   receive an input, wherein the input includes a designator, and wherein the designator identifies a non-executable statement to be inserted into the source code listing;
   display an interface proximate to the designator, wherein:
      the interface includes an external content identifier,
      the external content identifier indicates a location of external content,
      the external content identifier is associated with metadata, and
      the metadata is used to access the external content using the non-executable statement;
   receive the metadata based on the external content identifier being selected; and
   insert the metadata into the source code listing proximate to the designator, wherein the designator and the metadata form the non-executable statement in the source code listing; and
one or more processors configured to execute the programming editor.

16. The system of claim 15, wherein the external content comprises one or more of a really simple syndication (RSS) feed, an image, an audio clip or a video clip.

17. The system of claim 15, wherein the external content is associated with a uniform resource locator (URL).

18. The system of claim 15, further comprising:
a display device configured to display the programming editor.

19. The system of claim 15, further comprising:
a memory configured to store a database, wherein the database stores the external content.

20. One or more non-transitory computer readable storage media storing executable instructions that when executed by processing logic cause the processing logic to:
   detect a designator, wherein the designator denotes a non-executable string including metadata, and wherein the metadata identifies external content;
   interpret the metadata, wherein the interpreting comprises identifying a location of the external content based on an external content identifier in the metadata;
   identify the external content based on interpreting the metadata, wherein the external content includes one or more of:
      an image,
      video,
      an animation,
      audio,
      a web page,
      a result,
      a model,
      a link,
      an automated test,
      an example or demonstration code, or
      a really simple syndication (RSS) feed;
   communicate with a host of the external content;
   embed the external content into a source code listing; and
   store the source code listing and the embedded external content in storage, wherein:
      the external content identifier indicates a location of the external content,
      the external content identifier is associated with the metadata, and
      the metadata is used to access the external content using the non-executable string.

21. A method comprising:
creating, using a processing device, a source code listing in an editor;
receiving an input, wherein the input includes a designator, and wherein the designator identifies a non-executable statement to be inserted into the source code listing;
displaying an interface proximate to the designator, wherein:
   the interface includes an external content identifier,
   the external content identifier indicates a location of external content,
   the external content identifier is associated with metadata, and
   the metadata is used to access the external content using the non-executable statement;
receiving the metadata based on the external content identifier being selected; and
inserting the metadata into the source code listing proximate to the designator, wherein the designator and the metadata form the non-executable statement in the source code listing.

* * * * *

UNITED STATES PATENT AND TRADEMARK OFFICE
CERTIFICATE OF CORRECTION

| | |
|---|---|
| PATENT NO. | : 8,739,121 B1 |
| APPLICATION NO. | : 12/134805 |
| DATED | : May 27, 2014 |
| INVENTOR(S) | : Mark Jones et al. |

It is certified that error appears in the above-identified patent and that said Letters Patent is hereby corrected as shown below:

In the Claims

Column 16, line 27, (Claim 11), delete "claims" and insert --claim-- in lieu thereof Column 16, line 43, (Claim 12), delete "portion"

Column 17, line 3, (Claim 15), delete "creating"

Signed and Sealed this
Ninth Day of September, 2014

Michelle K. Lee
*Deputy Director of the United States Patent and Trademark Office*